United States Patent [19]

Shinohara

[11] Patent Number: 4,606,626
[45] Date of Patent: Aug. 19, 1986

[54] PROGRESSIVE MULTIFOCAL OPHTHALMIC LENSES WITH PRISM FOR CORRECTING CHROMATIC ABERRATION

[75] Inventor: Toshihide Shinohara, Suwa, Japan

[73] Assignee: Seiko Epson Corporation, Tokyo, Japan

[21] Appl. No.: 557,978

[22] Filed: Dec. 5, 1983

[30] Foreign Application Priority Data

Dec. 13, 1982 [JP] Japan .................... 57-218004
Jul. 29, 1983 [JP] Japan .................... 58-138768

[51] Int. Cl.$^4$ .............................................. G02C 7/06
[52] U.S. Cl. .................................... 351/169; 351/175
[58] Field of Search ................... 351/175, 168-172

[56] References Cited

U.S. PATENT DOCUMENTS 1,393,853 10/1921 Tillyer .................... 351/175
2,442,849 6/1948 Glazer .................... 351/175
4,315,673 2/1982 Guilino et al. ............ 351/169

Primary Examiner—John K. Corbin
Assistant Examiner—Scott J. Sugarman
Attorney, Agent, or Firm—Blum, Kaplan, Friedman, Silberman & Beran

[57] ABSTRACT

A progressive multifocal ophthalmic lens. The lens includes a lens surface having a far vision viewing, a near vision viewing zone and an intermediate vision viewing zone disposed therebetween. A prism having a base is added to the lens. The base lies in the direction of 90° to the lens surface. The prism is added in order to improve chromatic aberration and not to remedy squint.

10 Claims, 16 Drawing Figures

PROGRESSIVE MULTIFOCAL OPHTHALMIC LENSES WITH PRISM FOR CORRECTING CHROMATIC ABERRATION

BACKGROUND OF THE INVENTION

The present invention is directed generally to ophthalmic lenses and, in particular, to ophthalmic lenses having progressively varying focal power.

Eyeglasses or spectacles are indispensable for many persons. Even for people who do not need them now, eyeglasses may one day be required since the majority of people's eyes lose their ability to provide adequate vision. Lenses used in eyeglasses have several general requirements such as that they provide a clearer view to the wearer when in use, that they be thin and light, that they have a good appearance and that they not be easily damaged.

Heretofore, various materials for lenses were developed and marketed. At present, however, there are no lenses which satisfy all of the above requirements. This is because the refractive index of such materials must be large in order to make the lenses thin. However, the materials having a large refractive index have a small Abbe's number in general, and chromatic aberration generated at the periphery of the lens makes the outline of an object appear blurred and colored. This chromatic abberation is not so important for a single vision lens directed to remedy general myopia or hyperopia since ordinarily when eyeglasses are used, a wearer hardly uses the periphery of the lens, but, instead, uses portions of the lens proximate the center thereof.

Progressive multifocal lenses are intended to provide a person with presbyopia, i.e. a person whose ability to control his crystalline eye lenses has weakened, with an ophthalmic lens which compensates for such loss. Such a progressive multifocal ophthalmic lens has a far vision viewing zone or far zone in the upper portion of the lens, a near vision viewing zone or near zone in the lower portion of the lens and an intermediate vision viewing zone or interemediate zone in the lens portion intermediate the far and near zones of the upper and lower portions, respectively, of the lens. Each of the zones are smoothly adjacent to one another and are generally constructed from an aspherical refractive surface.

In the case of progressive multifocal lenses, chromatic aberration is a significant problem because of the three viewing zones in the lens. The near zone is about 15 to 25 mm below the center of the lens and chromatic abberation is a problem here. Because of this problem, conventional materials having a high refractive index are generally not used for progressive multifocal lenses.

Accordingly, progressive multifocal ophthalmic lenses which overcome the problems noted above including the problem of chromatic abberation, which improve the distribution of astigmatism and which are thinner and lighter, are desired.

SUMMARY OF THE INVENTION

Generally speaking, in accordance with the present invention, a progressive multifocal ophthalmic lens is provided. The lens includes a lens surface having a far vision viewing zone, a near vision viewing zone and an intermediate vision viewing zone disposed therebetween. A prism having a base is added to the lens. The base of the prism is oriented in a direction 90° to the lens surface whereby chromatic aberration is improved.

Accordingly, it is an object of the present invention to provide improved progressive multifocal ophthalmic lenses.

Another object of the present invention is to provide a multifocal ophthalmic lens which improves the distribution of astigmatism.

A further object of the present invention is to provide a progressive multifocal ophthalmic lens which is improved in chromatic abberation in the near vision viewing zone.

A still further object of the present invention is to provide a thinner and lighter progressive multifocal lens.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
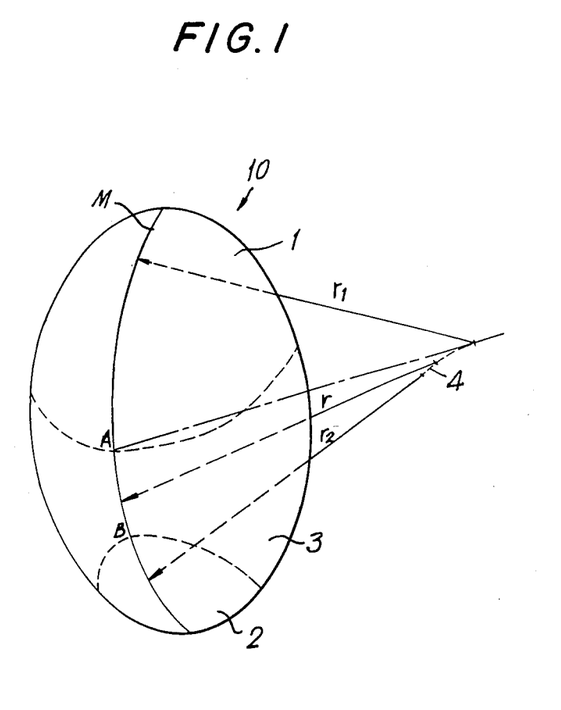
FIG. 1 is a perspective view of the refractive surface of a progressive multifocal ophthalmic lens.

Reference is first made to FIG. 1 which depicts the front surface of a progressive multifocal ophthalmic lens, generally indicated at 10. A principal meridian curve M extends substantially perpendicular along the center of the lens. Principal meridian curve M has an almost equal radius of curvature $r_1$ above a point A nearly in the center of the lens. Principal meridian curve M has an almost constant radius of curvature $r_2$ ($r_2 < r_1$) below a point B about 10 mm below point A. Between point A and point B, principal meridian curve M has a radius of curvature $r(r_2 < r < r_1)$ which varies successively. The portion of the center of curvature of the principal meridian curve varies along an evolute 4. The upper half portion of the lens above point A is far zone 1. The lower portion of the lens below point B is near zone 2. An intermediate zone 3 extends between far zone 1 and near zone 2.

In the case where progressive multifocal lenses are used in eyeglasses, the far, near and intermediate zones are so fitted that the line of vision of a wearer passes through a point in the far zone near point A at the time when a wearer looks forward. The near zone is positioned in a peripheral portion of the lens in a lower portion of the eyeglasses. This is one characteristics of a progressive multifocal lens. In the case of a general single vision lens which compensates for near-sightedness or far-sightedness, a wearer looks through a center portion of the lens even when viewing an object in near vision and even in far vision. Even while reading, a wearer looks through a portion 5 to 8 mm below the center of the lens.

Another characteristic of a progressive multifocal ophthalmic lens is that inevitably there is astigmatism and distortion of the images due to the partly large change of the refractive power. These shortcomings are respectively perceived as image indistinctness and shaking of the image when the wearer moves his head. A significant problem of a progressive multifocal lens is to reduce such viewing defects. The present inventor has described improved lenses having well-reduced astigmatism and distortion of images in co-pending U.S. patent application Ser. No. 327,288, filed Dec. 3, 1981 now U.S. Pat. No. 4,580,883. According to these inventions, the refractive surface of the lens is divided into three zones, the far zone, intermediate zone and near zone, by two curves, one passing through the center of the far vision zone and the other through the center of the near vision viewing zone. The characteristic of these lenses is that an angle formed by a line normal to the refractive surface from each point along the intersection of an arbitrary plane which is parallel to a plane including the principal meridian curve changes in accordance with the same law as that of the curvature on the principal meridian curve. This permits the astigmatism to be smoothly distributed and the change of image distortion to be easy.

Moreover, the surface near the principal meridian curve in the center portion in the far zone and in the near zone is made spherical or practically spherical. In the peripheral portion of the lens, the curvature in the direction at right angles to the principal meridian curve increases and decreases respectively as it moves away from the principal meridian curve. Thus, image distortion is compensated and astigmatism in the side of the intermediate portion is reduced.

The shape of a progressive multifocal lens is determined not only by the construction of the shape of the curved surface in each zone of the lens but also by the base curve thereof. In the case of a progressive multifocal lens, the base curve is defined as the main focal power (dioptre=D) of the refractive surface of the lens in the far zone. The determination of the base curve allows the curve in the near zone to be fixed by adding the additional power into the base curve. By further adding the change of curvature in the horizontal direction as described above, the shape of the refractive surface of the lens is finally formed.

The base curve is closely related with the focal power of the lens on the optical characteristics of the lens. Thus, designation of focal power of the lens limits the optically suitable base curve. How the focal power of the lens is related with the base curve has been studied for a long time. The famous Tscheerning's ellipse is one principle which was found from such a study.

Figure 2:
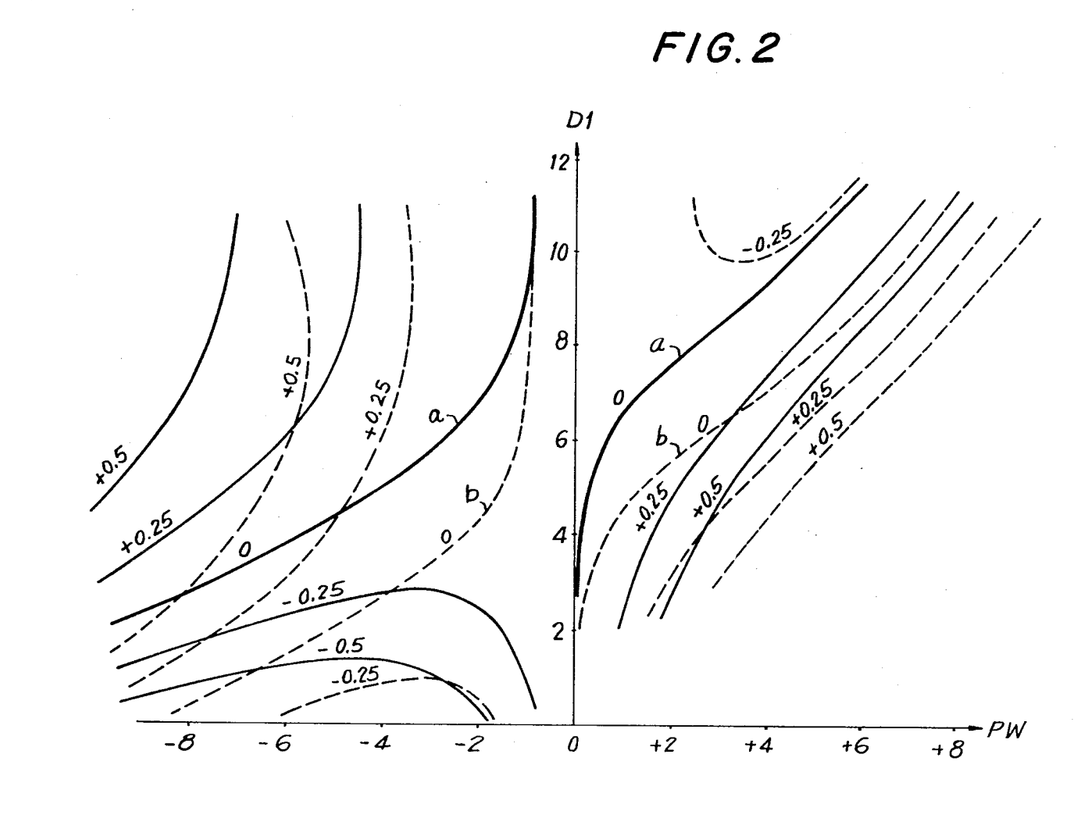
FIG. 2 is a graph depicting how astigmatism is related to the base curve ad the focal power in the visual angle of 30 degrees on a single vision lens.

FIG. 2 depicts an astigmatism viewing in the direction of a 30 degree angle from an optical center axis (hereinafter referred to as a visual angle) when a user wears a single vision lens. The ordinate represents the base curve and the abscissa represents the focal power of the lens. The astigmatism when a wearer views far vision is indicated by the solid line. Solid line "a" represents the relation of the base curve and the focal power when the astigmatism is zero. The astigmatism when a wearer views near vision is indicated by the broken line. Broken line "b" represents the relation of the base curve and the focal power when the astigmatism is zero. The principal focal powers produce the astigmatism. Namely, the difference between the maximum focal power and the minimum focal power becomes the astigmatism. The sign + means that the maximum focal power turns in the radius direction of the lens. The sign − means that the maximum focal power is in the circumferential direction of the lens. The sign is minus below zero-line ("a","b") in a range where the power of the lens is − and is plus above zero-line in a range where the power of lens is +. The astigmatism increases as it moves far away from solid line a and broken line b.

In the usual single focal power ophthalmic lenses, the base curve is determined to be between solid line a where the astigmatism is zero in the far zone and the broken line b where the astigmatism is zero in the near zone in accordance with the power of the lens, in an effort to reduce the astigmatism in the far zone and the near zone.

On the other hand, according to a progressive multifocal ophthalmic lens, it is complicated to determine the base curve as compared to a single vision lens. The viewing zone through which a wearer views the object is determined by the distance between the lens and the object. Thus, it is desirable for the astigmatism to be small in the far zone when a wearer watches the object in the far distance and also to be small in the near zone when a wearer watches the object in the near distance.

Figure 3:
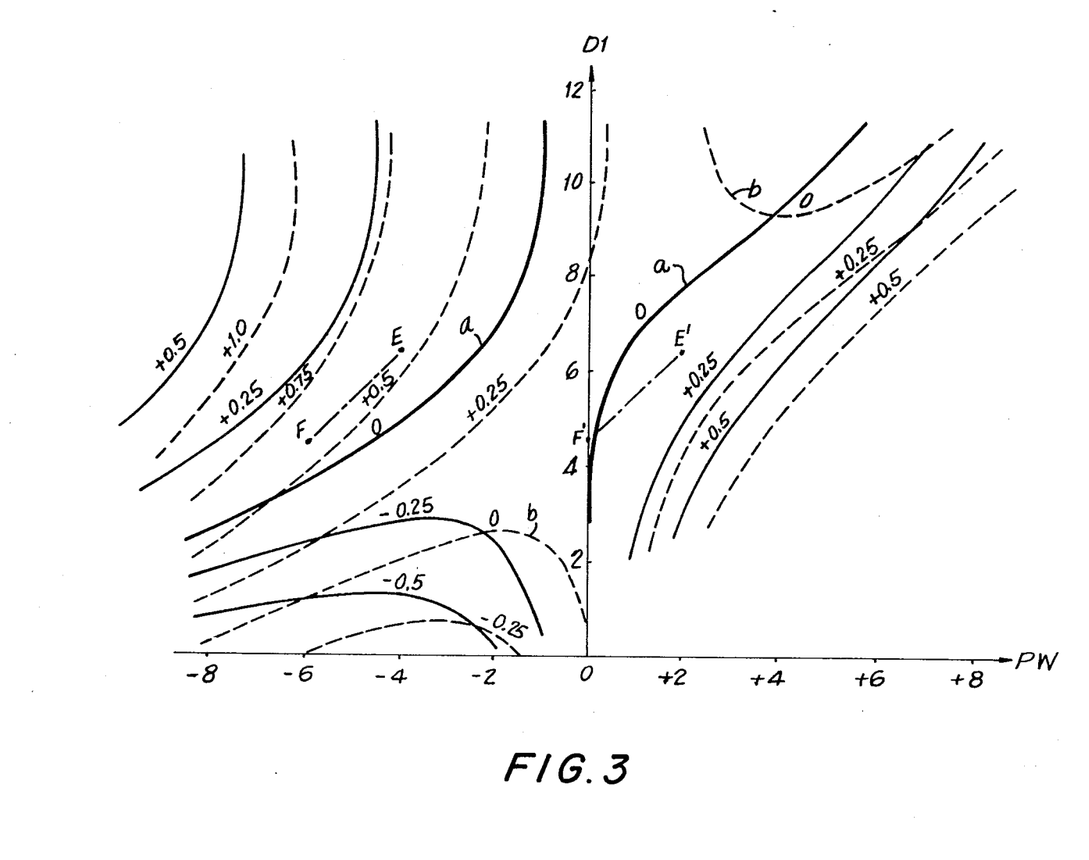
FIG. 3 is a graph depicting the astigmatism to a base curve and a power of a progressive multifocal lens in the visual angle of 30 degrees.

FIG. 3 shows the relation between the power and the base curve on the astigmatism in a progressive multifocal lens. The description in the drawing is the same as that in FIG. 2. With reference to the progressive multifocal lens, the line a in the far zone is positioned in the same place as in FIG. 2. Line b in the near zone is positioned in the lower part of the graph in a range where the focal power is minus and positioned in the upper part in a range where the focal power is plus. This is because the center of the curvature in the near zone is not provided on the optical axis as the lens of FIG. 1. In this drawing, the eccentricity of the center of the curvature in the near zone is 3 mm against the optic axis. The larger the eccentricity is, the greater the tendency read in this drawing is. With reference to a progressive multifocal lens, as an object in the near distance is viewed by a wearer through the near zone of the lens, the base curve represented by the ordinate and the focal power represented by the abscissa in the near vision viewing zone in FIG. 3 represents respectively the focal power of the refractive surface of the lens and the power of the lens in the near zone. Therefore, the base curve and the power in this graph are different from the ordinary base curve and the ordinary power of the progressive multifocal power lens.

For example, in a case where a progressive multifocal lens has a base curve of 4.5 dioptre (hereinafter referred to as D), an additional power of 2.0D, and the power of −6.0D, the refractive surface of the lens is 6.5D and the power of the lens is −4.5D in the near zone. The astigmatism in a visual angle of 30 degrees is indicated as F in the far zone and indicated as E in the near zone in this figure. It is clear that, while the astigmatism is small and good in the far zone, it is large in the near zone. On the other hand, in the case of a progressive multifocal lens of base curve 4.5D and additional power 2.0D, of the same shape refractive surface as the above having a focal power of of 0.0D, the astigmatism in the visual angle of 30 degrees is indicted by F' in the far zone and indicated by E' in the near zone. From this drawing, it is seen that the astigmatism is small both in the far zone and in the near zone. These experimental results are represented in more detail in FIGS. 4A, 4B, 5A and 5B.

Figure 4A:
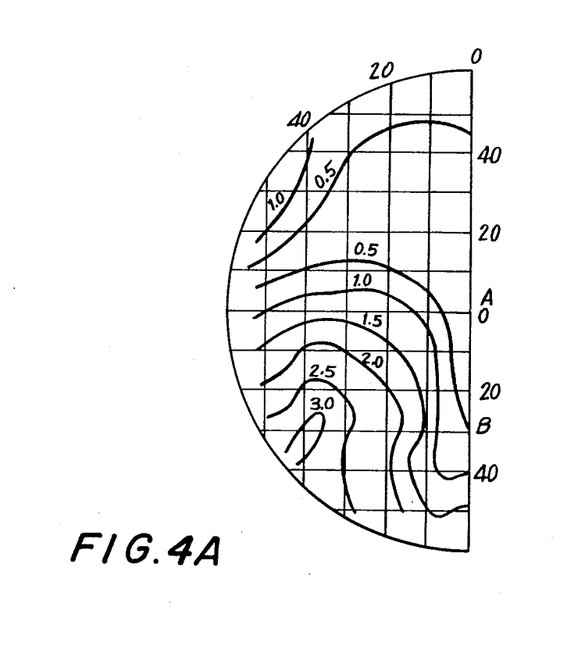
FIGS. 4A and 4B show the distribution and direction of astigmatism, respectively, of a progressive multifocal lens.
Figure 4B:
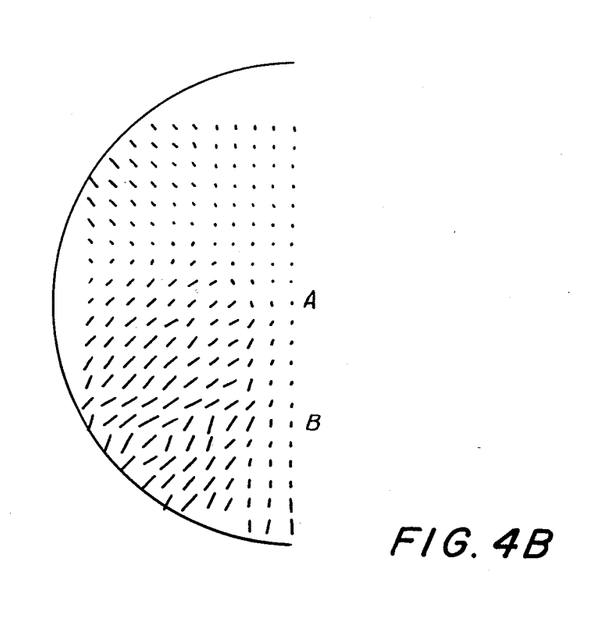
Figure 5A:
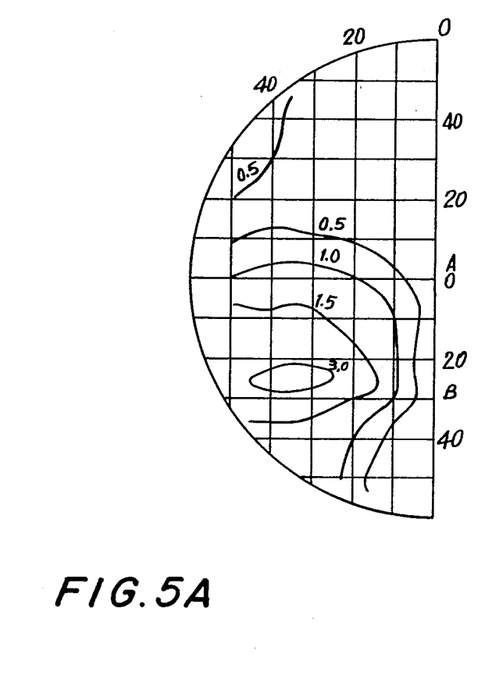
FIGS. 5A and 5B show the distribution of astigmatism and direction of astigmatism, respectively, of another progressive multifocal lens.
Figure 5B:
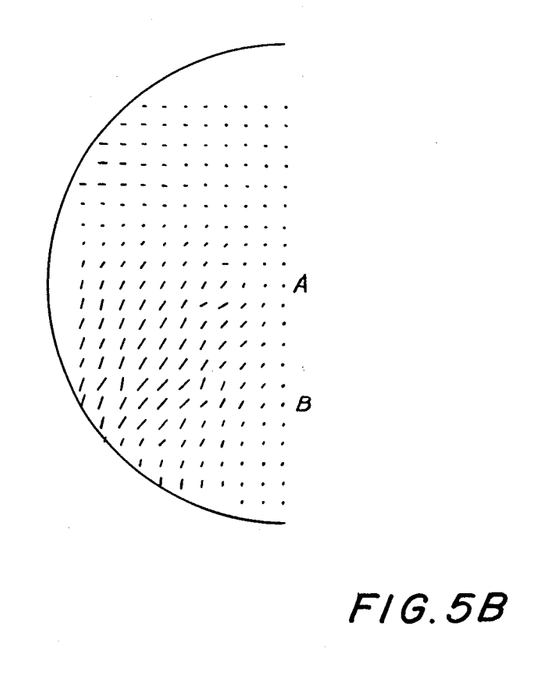

Lenses used in FIGS. 4A through 5B are the same as those described in U.S. patent application Ser. No. 327,288 filed Dec. 3, 1981, now U.S. Pat. No. 4,580,883, having a base curve of 4.5D and an additional power of 2.0D. The refractive surfaces of the lenses are all the same in shape. A focal power of the lens of FIGS. 4A and 4B is −6.0D and that of the lens of FIGS. 5A and 5B is 0.0D. FIGS. 4A and 5A show the distribution of the astigmatism in a half of the lens taken along the principal meridian curve. FIGS. 4B and 5B show the direction of the maximum focal power of the astigmatism (hereinafter referred to as the astigmatism direction) and the magnitude thereof. A part in the upper portion and in the side is abbreviated. The co-ordinate axis is a visual angle. Points A and B represent the centers of the far zone and the near zone, respectively. In FIGS. 4A and 4B a large astigmatism is seen in the lower portion from the visual angle of 30 degrees in the near zone. The astigmatism direction is almost perpendicular. Another large astigmatism is also shown in the side of the intermediate zone.

On the other hand, in FIGS. 5A and 5B, a large astigmatism is not shown in any zone. The reason why the astigmatism of the lens of FIGS. 4A and 4B is different from that of the lens of FIGS. 5A and 5B is now explained. The astigmatism of a lens having an aspherical surface is caused by the aspherical surface factor and by the base curve factor. The aspherical surface factor is that the refractive surface of a lens is aspherical. The astigmatism inheres in an aspherical surface and never exists in a spherical surface. The base curve factor is that of the relation of the base curve and the focal power of a lens. These two factors are taken into consideration relating to the following description. Both lenses have the same front refractive surface in shape and their back refractive surface are spherical. Accordingly, the aspherical surface factor is common in both lenses. In other words, the difference of the astigmatism of these lenses is caused only by the base curve factor.

The difference of both lenses relating to FIG. 3 which depicts how the base curve is related with the focal power of the lens also corresponds to the difference of the astigmatism between FIGS. 4A and 4B and FIGS. 5A and 5B. To describe in more detail, as shown in FIG. 3, a progressive multifocal lens having a focal power of a lens of 0.0D in FIGS. 5A and 5B is almost independent of a base curve factor and the astigmatism thereof is caused by the aspherical surface factor. In FIG. 5B, the astigmatism direction is horizontal in the side of the far zone, while it is perpendicular in the side of the near zone. This is due to the shape of a horizontal section of a lens which contributes to restrain the image distortion and the astigmatism in the side of the intermediate zone. That is, the horizontal section of the lens is so shaped that the curvature in the side of the lens increases in the far zone and decreases in the near zone.

Figure 6A:
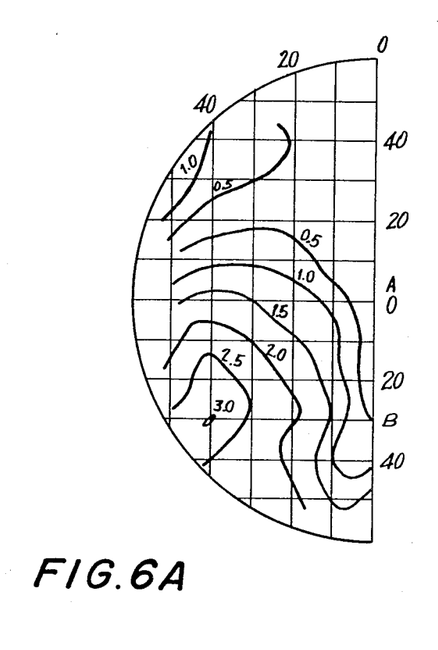
FIGS. 6A and 6B show the distribution of astigmatism and the direction of astigmatism, respectively, of still another progressive multifocal lens.
Figure 6B:
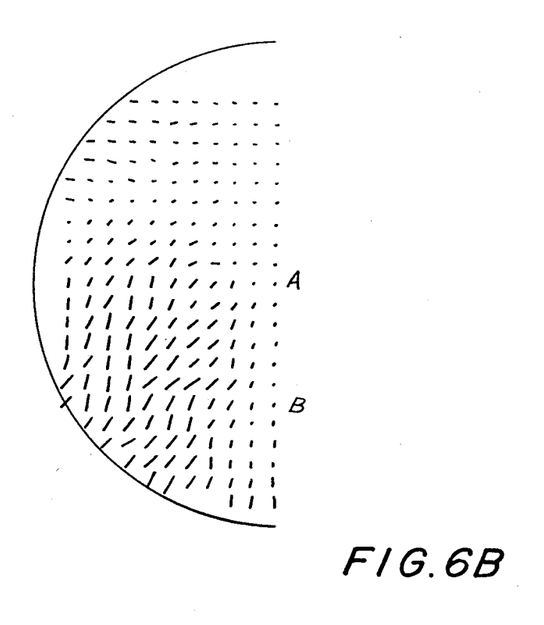

On the other hand, the lens of FIGS. 4A and 4B is affected by the base curve factor which is indicated by EF in FIG. 3. The base curve factor causes a small astigmatism of + direction in the far zone and a large astigmatism of + direction in the near zone, which is confirmed by FIG. 4B. It is clear that the astigmatism takes a rapid increase in the side as the astigmatism direction by the aspherical factor and that by the base curve factor are almost equal in the near zone. Thus, a lens of a focal power of −6.0D in FIGS. 4A and 4B is hard to put into practical use because the astigmatism in the near zone is great. Therefore, it is under consideration to change the base curve for the purpose of reduction of astigmatism. For example, the astigmatism is supposed to improve if the base curve is dropped from 4.5D to 2.5D. More concretely, the lens depicted in FIGS. 6A and 6B is the same as that of FIGS. 4A and 4B but with a different base curve. The base curve of the lens of FIGS. 6A and 6B is 2.5D. This lens is affected by the aspherical surface factor quite equally to that of the lens of FIGS. 4A and 4B. As compared with FIG. 4A, the astigmatism distribution represented in FIG. 6A is still large in the near zone. There is no improvement in astigmatism between both lenses. In FIG. 3, the astigmatism in the near zone is indicated by the broken line when the eccentricity of the center of curvature in the near zone is 3 mm. As the base curve decreases, the eccentricity increases and the astigmatism moves into the + direction, even if the additional power is equal. Therefore, in the case of FIGS. 6A and 6B, the astigmatism of +0.2D is added to the lens of FIG. 3. As a result, the astigmatism in the near zone of the lens of FIGS. 6A and 6B is almost equal to that of the lens of FIGS. 4A and 4B. On the other hand, the astigmatism in the side of the upper portion in the far zone is great due to the aspherical surface factor and the base curve factor. Namely, the astigmatism direction is horizontal which is caused by the aspherical factor. Further, the base curve factor is added thereto in the − direction, i.e., in the peripheral direction with respect to the center of the lens.

As described above, the base curve is very complicated to be determined in a progressive multifocal lens, unlike the single vision lens. Moreover, as described above, just to consider to set the base curve is not enough to provide a satisfactory performance for a lens. Thus, this invention is offered to improve a progressive multifocal lens in which the astigmatism is small by using a simple prescription instead of a complicated design of a lens.

Figure 7A:
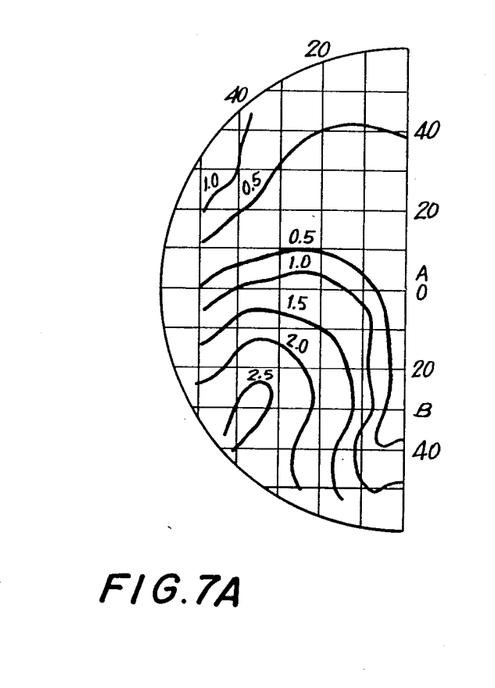
FIGS. 7A and 7B show the distribution of astigmatism and direction of astigmatism, respectively, of the progressive multifocal lens depicted in FIGS. 4A and 4B, in accordance with the present invention.
Figure 7B:
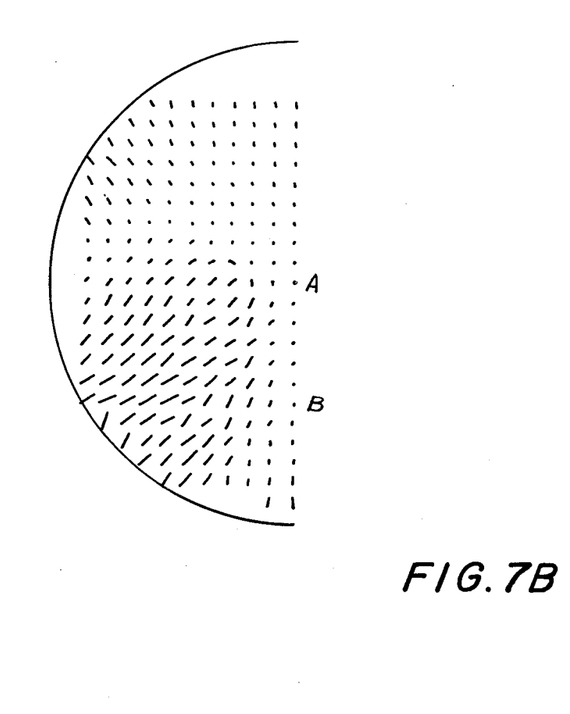

Reference is now made to FIGS. 7A and 7B in order to describe a progressive multifocal ophthalmic lens constructed in accordance with an embodiment of the present invention. The lens used in FIGS. 7A and 7B has the same refractive front surface as the lens in FIGS. 4A and 4B. This lens has a base curve of 4.5D, an additional power of 2.0D and the power of −6.0. Moreover, this lens has a 2.0 prism D whose base is in the direction of 90 degrees. This is an important characteristic of the present invention. The prism is equally added to both lenses of the eyeglasses or spectacles. In a conventional lens, a prism prescription is made with the object of compensating for a squint, or a prism having a base in the direction of 270 degrees is added to both lenses with the object of thinning the lens.

In FIGS. 7A and 7B, the astigmastism is remarkably reduced in the near zone and also decreased in the side of the intermediate zone. In the far zone, though the astigmatism is a little off in the upper portion, a range where an astigmatism is small comes down as compared to FIGS. 4A and 4B in the side portion. Considering that the upper portion of the lens is cut off at the practical putting of a lens into a eyeglass frame, the astigmatism is substantially improved.

Figure 8:
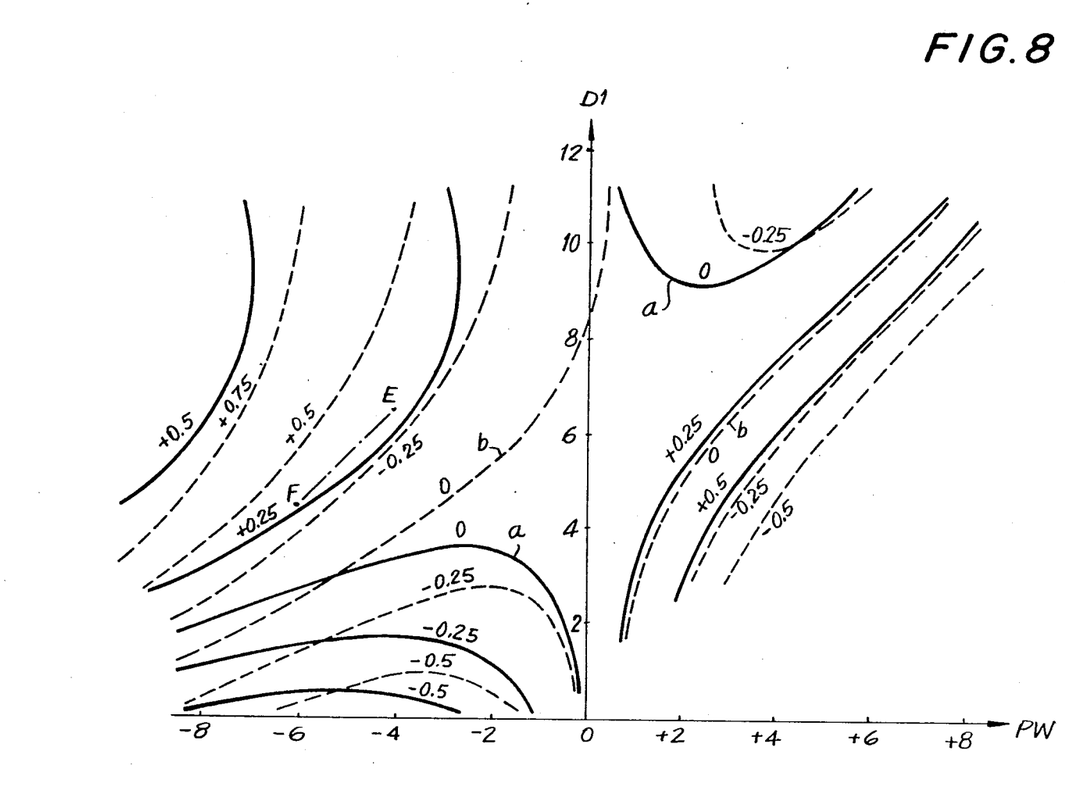
FIG. 8 is a graph depicting the astigmatism to a base curve and a power in the visual angle of 30 degrees in a progressive multifocal lens constructed in accordance with the present invention.

This invention is effective as described hereinafter with respect to FIG. 8 wherein the astigmastism depending on the base curve and the focal power of a lens in the far zone and in the near zone is shown at the time when a prism of 2.0 prism D whose base is in 90 degrss is added. The eccentricity in the near zone is 3 mm as shown in FIG. 3. As compared to FIG. 3, addition of a prism having a base in the direction of 90 degrees transfers the astimatism into the plus side in the far zone and turns it onto the minus side in the near zone. Accordingly, in the near zone, the astigmatism in the plus direction bringing a large astigmatism is greatly reduced. In the far zone, the astigmatism in the plus side in the direction where the aspherical factor in the side is compensated is remarkably increased. Thus, the effect of this invention as described hereinbefore is obtained.

The change of the astigmatism due to the addition of the prism whose base is in the direction of 90 degrees, i.e. the change due to the base curve factor, is dependent on to the amount of the prism effect. As the amount of prism is increased, the astigmatism is moved into the plus side in the far viewing zone and into the minus side in the near viewing zone. As a result, the most suitable amount of the prism effect to be added can be selected depending on such factors as base curve, power of the lens, and design of the refractive surface of the lens. The present inventor has found that the amount of the prism effect of less than 1.0 prism D is too little to obtain the available effect, and the amount of the prism effect of more than 6.0 prism D breaks the performance of the lens as the change due to the base curve factor is too great. Moreover, a large addition of the amount of the prism effect damages the appearance of the lens. It follows that the most suitable amount of the prism effect should be determined in a range of 1.0 to 6.0 prism D.

Another effect of the present invention is to reduce the number of kinds of lenses. There are many different kinds of conventional lenses according to the base curve depending on the power of the lenses. In the present invention, on the contrary, adding the prism whose base is in the direction of 90 degrees and/or changing the amount of the prism effect allows only one kind of base curve to cover a wide range of the power of the lens. Thus, the kinds of lenses are significantly decreased which is very convenient to mass production.

According to the present invention as described above, the astigmatism of the progressive multifocal lens can easily be improved only by the simple prescription that the prism whose base is in the direction of 90 degrees is added.

In the embodiment described herein above, a prism is added in the direction of the principal meridian curve for the purpose of description. It is noted that the invention is applicbale to other cases wehre the principal meridan curve is declined in some degree taking consideration of the convergence in the near viewing zone. Additionally, in this embodiment, a lens of minus power has been described. It is also within the scope of the invention to apply the present invention to a lens of plus power. Furthermore, it is within the scope of this invention that a prism may be added in the shifted direction from 90 degrees.

Figure 9:
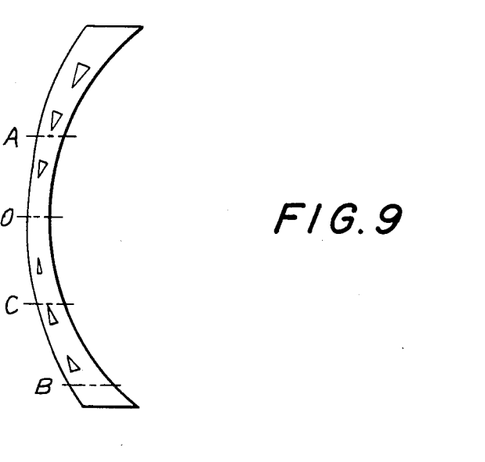
FIG. 9 is a cross-sectional view of a progressivemultifocal lens having a prescription for remedying myopia.

FIG. 9 depicts a conventional progressive multifocal lens having a process for remedying myopia in a far vision zone, where a triangle show prisms at each position, the size of the triangle shows the amount of the prism and the direction of the triangles shows the base of the prism.

Figure 10:
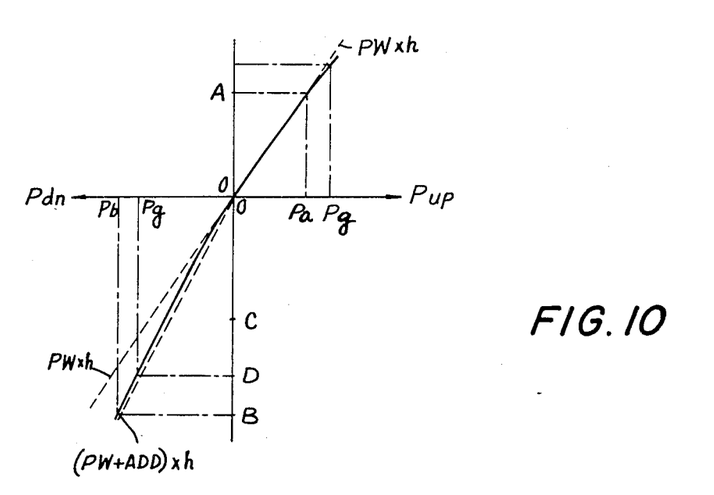
FIG. 10 is a graph illustrating the distribution of prisms in the lens of FIG. 9.

Referring now to FIG. 10, the ordinate represents the position at the vertical cross-section of the lens, wherein O represents a fitting point, that is, the front position of the wearer's eyes. A and B represent, respectively, an upper end and a lower end of a lens used in eyeglasses. The portion of the lens between the two points O and A is a far zone, the portion of the lens between the two points C and B is a near zone. The abscissa represents prisms, wherein the right portion with respect to the ordinate illustrates the amount of prism $P_{up}$ whose base is in the direction of 90 degrees and the left portion illustrates the amount of prism $P_{dn}$ whose base is in the direction of 270 degrees. In the case of a single vision lens, the amount of the prism B at each position of the lens is obtained by the following approximate equation:

$$P = PW \times h \qquad (1),$$

wherein "PW" represents the power of the lens (the unit is dioptre) and the "h" represents the distance from the optical center (the unit is centimeters and, ordinarily the optical center nearly coincides with a fitting point). In the case of a progressive multifocal lens, as shown by the figure, since the prescribed power of the lens is approximately PW in all of the far zone, the amount of the prism is obtained by the approximate equation (1). But, in a zone between the points O and C the prescribed power increases gradually to be the fixed power to which additional power (ADD) is added, that is, the prescribed power (PW+ADD). Therefore, the amount of the prism gradually approaches to the beeline (PW+ADD)×h rather than the beeline PW×h.

The magnitude of the chromatic aberration of a lens I is represented by the following equation:

$$I = P/\nu \qquad (2),$$

wherein $\nu$ is Abbe's number of the lens materials and P is the amount of the prism. It is generally known that chromatic aberration is perceived when its magnitude is represented by the following equation:

$$I = P/\nu > 0.2 \qquad (3).$$

Conversely, when the chromatic aberration generated within a scope of use of a lens as spectacles complies with the relationship:

$$I = P/\nu < 0.2 \qquad (4)$$

a lens is used as spectacles without being influenced by chromatic aberration.

Referring back to FIG. 10, in a progressive multifocal lens, the amount of prism becomes greatest at Pa of the upper end A of the lens in a far zone and it becomes the greatest at Pb of the lower end B of the lens in a near zone. As illustrated in FIG. 10, the distance between B and an optical center is about two times as great as that between A and an optical center, therefore the relationship Pb > Pa exists. Accordingly, chromatic aberration occurs first in a near zone of the material having a small Abbe's number. Namely, when the limit of the amout of prism to which a chromatic aberration is perceived is assumed to be Pg, Pg is represented by:

$$Pg = 0.2 \times \nu \qquad (5)$$

When $\nu$ becomes small to some degree like the high refractive index materials, the amount of prism exceeds the limit value Pg at a zone between points D and B in a near zone (but, in a far zone the amount of prism is within the limitation of the value Pg). Accordingly, a chromatic aberration is perceived at a zone between D and B in a near zone.

Figure 11:
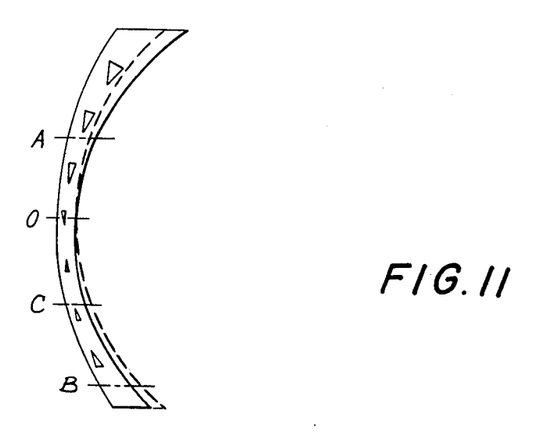
FIG. 11 is a cross-sectional view of a progressive multifocal lens having a prescription for remedying myopia, constructed in accordance with the present invention.

The next embodiment of the present invention is explained in accordance with the embodiment shown in FIG. 11. FIG. 11 is a vertical cross-section of a progressive multifocal lens having prescription for remedying myopia in accordance with the present invention. The broken line in FIG. 11 correspondences to the lens of FIG. 9. The feature of the present invention is to provide a progressive multifocal lens to which a prism whose base is in the direction of 90 degree is added. This prescription is provided with left and right lenses of spectacles or eyeglasses equally and the purpose of this prescription is not to remedy squint.

Figure 12:
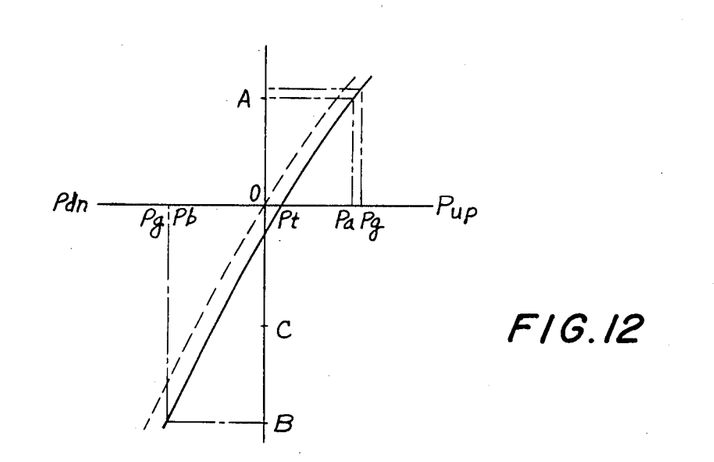
FIG. 12 is a graph illustrating the distribution of prisms in the lens depicted in FIG. 11.

Referring to FIG. 12, a graph similar to that of FIG. 10 is depicted. A broken line in FIG. 12 corresponds to the embodiment shown in FIG. 10. As shown in FIG. 12, the prism increases in a far zone and it decreases in a near zone by adding a prism whose base is in the direction of 90 degrees. Since the increase and decrease of the prism means the increase and decrease of a chromatic aberration, the chromatic aberration increases in a far zone and decreases in the near zone. In accordance with this embodiment, Pt is determined so as to equalize the amount of prism Pb at the lower end B in a near zone and the limit of the amount of prism Pg to which a chromatic abberration is perceived. Therefore, a chromatic aberration is not perceived within a scope of use of a near zone of the lens and comfortable vision is available. Then, a chromatic aberration in the far zone must be considered.

As described above, a chromatic aberration is perceived in the far zone since the amount of prism is increased by adding a prism whose base is in the direction of 90 degrees. As is apparent from FIG. 12, the distance between the point O and the upper end in the far zone A is in general from 10 to 15 mm, which is not so long that the amount of prism Pa at the upper end A hardly exceeds the limit value Pg by the increase of prism. Accordingly, a chromatic aberration is not perceived even in a far zone and comfortable view is available. As described above, in accordance with this invention, a chromatic aberration in a near zone is improved by adding a prism whose base is in the direction of 90 degrees. The amount of prism added to the lens is determined as follows.

The magnitude of prism Pb at the lower end B in a near zone is given by the approximate equation $Pb = -(PW \times ADD) \times OB$, wherein OB represents the distance (cm) between the points O and B, and by adding prism Pt whose base is in the direction of 90 degrees, the prism at the point B is represented by the following expression: Pb−Pt. Pb−Pt is substituted into equation (4) representing a condition that a problem caused by a chromatic aberration does not occur, from which the following equation is derived:

$$Pt > Pb - 0.2 \times \nu = -(PW + ADD) \times OB - 0.2 \times \nu,$$

further the following equation is derived from the above:

$$Pt > -k \times (PW + ADD) - 0.2 \times \nu \qquad (5),$$

wherein k and $O = 1.5 \leq k \leq 2.5$, that is, coefficient k represents the distance between the points O and B and such limitations as the above are given by construction of a lens and a wearer's individual difference within a scope of use of the lens. In a case when the right side of equation (5) becomes minus, it is not necessary to add a prism whose base is in the direction of 90 degrees because of no perception of a chromatic aberration.

When the value Pt determined by equation (5) is so large that an obstacle on a vision is caused or a large chromatic aberration is generated in a far zone, by making the value Pt less than that of the equation (5) and providing yellowish, brownish or bluish coloring on a lens, a comfortable lens without having the problem caused by chromatic aberration is obtained. This is because a human perceives a yellow and blue blur appearing on an outline of an object as a chromatic aberration, and yellowish, brownish or bluish coloring to a lens makes it difficult to perceive the chromatic aberration which cannot be eliminated only by adding prism Pt.

Further, this invention gives the following effect, that is, providing a thinner and lighter lens. As is apparent from the comparison of a lens in accordance with this invention with a conventional lens shown by the broken line in FIG. 11, the lens become thick at the side of the far zone and becomes thin at the side of a near zone by adding a prism whose base is in the direction of 90 degrees. Accordingly, as a lens, there is no effect from being thinner and lighter because thickness at a far zone and thinness at a near zone are offset by each other. However, on the condition that the lens is put in an eyeglass frame, the ratio of area of a far zone against an intermediate zone and a near zone is approximately 1:2. Therefore, when the lens is used in eyeglasses, a thin and light lens is provided.

As described above, in accordance with the present invention, in a progressive multifocal ophthalmic lens having a small Abbe's number, it is advantageous in that chromatic aberration in a near zone is improved and a thinner and lighter lens is obtained. In a case where the prism base is somewhat out of the direction of 90 degrees, the same effect as the present invention may be obtained. Thus, it should be noted that such a case is also included in the present invention.

It will thus be seen that the objects set forth above, among those made apparent from the preceding description, are efficiently attained and, since certain changes may be made in the above article without departing from the spirit and scope of the invention, it is intended that all matters contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A progressive multifocal ophthalmic lens comprising a lens surface have a far vision viewing zone, a near vision viewing zone and an intermediate vision viewing zone disposed intermediate said far and near vision viewing zones, said far vision viewing zone having a prescription for correcting myopia in a wearer, and a prism having a base added to said lens, said prism altering the chromatic aberration of said lens, said base of said prism being in the direction of 90° to said lens surface, wherein the following relationship is present to improve the chromatic aberration altered by the addition of said prism to said lens:

$$Pt > -k \times (PW + ADD) - 0.2 \times v,$$

where $1.5 < k < 2.5$,
wherein "$Pt$" is the magnitude of said prism, "$v$" is the Abbe's number of the lens material, "$PW$" is the power of said lens, and ADD is the additional power.

2. The progressive multifocal ophthalmic lens as claimed in claim 1, wherein said lens is tinted with a color from the group consisting of yellow, brown and blue.

3. The progressive multifocal ophthalmic lens as claimed in claim 1, wherein said far vision viewing zone includes a side portion and a center portion, the curvature of a section of said far vision viewing zone in a direction horizontal to said refractive surface increasing more in said side portion than in said center portion.

4. The progressive multifocal ophthalmic lens as claimed in claim 3, wherein said prism is added to said lens not for the purpose of compensation of squint.

5. The progressive multifocal ophthalmic lens as clamed in claim 3, wherein the magnitude "$Pt$" of said prism, in prism dioptres, is:

$$1.0 \leq Pt \leq 6.0.$$

6. The progressive multifocal ophthalmic lens as claimed in claim 3, wherein said near vision viewing zone includes a side portion and a center portion, the curvature of a section of said near vision viewing zone in a direction horizontal to said refractive surface decreasing more in said side portion than in said center portion.

7. The progressive multifocal ophthalmic lens as claimed in claim 1, wherein the magnitude "$Pt$" of said prism, in prism dioptres, is:

$$1.0 \leq Pt \leq 6.0.$$

8. The progressive multifocal ophthalmic lens as claimed in claim 1, wherein said near vision viewing zone includes a side portion and a center portion, the curvature of a section of said near vision viewing zone in a direction horizontal to said refractive surface decreasing more in said side portion than in said center portion.

9. The progressive multifocal ophthalmic lens as claimed in claim 8, wherein said prism is added to said lens not for the purpose of compensation of squint.

10. The progressive multifocal ophthalmic lens as claimed in claim 8, wherein the magnitude "$Pt$" of said prism, in prism dioptres, is:

$$1.0 \leq Pt \leq 6.0.$$

* * * * *